United States Patent
Kim

(10) Patent No.: US 8,700,039 B2
(45) Date of Patent: Apr. 15, 2014

(54) METHOD AND APPARATUS FOR COORDINATED MULTIPLE POINT TRANSMISSION AND RECEPTION

(75) Inventor: Hakseong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 511 days.

(21) Appl. No.: 12/702,765

(22) Filed: Feb. 9, 2010

(65) Prior Publication Data

US 2010/0203887 A1    Aug. 12, 2010

Related U.S. Application Data

(60) Provisional application No. 61/151,190, filed on Feb. 10, 2009, provisional application No. 61/151,846, filed on Feb. 12, 2009.

(51) Int. Cl.
*H04W 36/00* (2009.01)

(52) U.S. Cl.
USPC ........... 455/436; 455/438; 455/524; 455/525; 455/456.1

(58) Field of Classification Search
USPC ............ 455/524, 436–444, 525, 456.1–456.6
See application file for complete search history.

(56) References Cited

U.S. PATENT DOCUMENTS

| | | | |
|---|---|---|---|
| 2007/0248172 A1* | 10/2007 | Mehta et al. | 375/260 |
| 2010/0056215 A1* | 3/2010 | Gorokhov et al. | 455/561 |
| 2010/0103834 A1* | 4/2010 | Gorokhov et al. | 370/252 |
| 2010/0195599 A1* | 8/2010 | Zhang et al. | 370/329 |
| 2011/0200029 A1* | 8/2011 | Farmandar et al. | 370/338 |

* cited by examiner

*Primary Examiner* — Ajit Patel
(74) *Attorney, Agent, or Firm* — McKenna Long & Aldridge LLP

(57) ABSTRACT

A method and apparatus for cooperative multiple point transmission and reception (CoMP) are provided. The method includes: receiving channel information for a cell included in a clustering set from a user equipment; determining an active set consisting of a cell performing CoMP on the user equipment by using the channel information; and determining a cooperation period in which at least one of the clustering set and the active set is applied to the user equipment, where the clustering set denotes a set of candidate cells which can be included in the active set.

6 Claims, 14 Drawing Sheets

METHOD AND APPARATUS FOR COORDINATED MULTIPLE POINT TRANSMISSION AND RECEPTION

CROSS-REFERENCE TO RELATED APPLICATIONS

This application claims the benefit of priority of U.S. Provisional application 61/151,190 filed on Feb. 10, 2009, and U.S. Provisional application 61/151,846 filed on Feb. 12, 2009, all of which are incorporated by reference in their entirety herein.

BACKGROUND OF THE INVENTION

1. Field of the Invention

The present invention relates to wireless communications, and more particularly, to a method and apparatus for transmitting a control signal in a wireless communication system for cooperative multiple point transmission and reception (CoMP).

2. Related Art

Recently, wireless mobile communication systems require high-speed data communication such as multimedia services. Further, there is ongoing research for performance improvement of a user equipment located in a cell edge in a communication system having a multi-cell structure. In particular, research on cooperative multiple point transmission and reception (CoMP) for transmitting a signal by mutual cooperation between cells in the communication system having the multi-cell structure is actively carried out. According to the CoMP, a user equipment, especially the user equipment located in the cell edge, can communicate with a plurality of base station and thus can improve not only a transmit power gain but also signal sensitivity.

The CoMP uses a mechanism which defines cells participating in actual cooperative communication among many cells and reports information on the defined cells to a user equipment. In order to define the cells participating in actual cooperative communication and to report a specific time duration in which the cells are effective, a large amount of control information needs to be exchanged between cells. This may result in the increase of a system overhead and may cause deterioration of system efficiency.

Accordingly, there is a need for a method and apparatus capable of determining cells participating in cooperative communication adaptively to a channel condition without having to exchange an excessive amount of control information and capable of delivering a period in which the determined cells are maintained in a wireless communication system performing CoMP.

SUMMARY OF THE INVENTION

The present invention provides a method and apparatus for cooperative multiple point transmission and reception (CoMP) by adaptively considering a time-varying wireless channel condition between a base station and a user equipment.

The present invention also provides a method and apparatus for allowing a user equipment in a cell located at an edge of a set of cells participating in CoMP to select optimal cooperation cells.

According to an aspect of the present invention, a method of CoMP is provided. The method includes: receiving channel information for a cell included in a clustering set from a user equipment; determining an active set consisting of a cell performing CoMP on the user equipment by using the channel information; and determining a cooperation period in which at least one of the clustering set and the active set is applied to the user equipment, where the clustering set denotes a set of candidate cells which can be included in the active set.

According to another aspect of the present invention, a cooperation determination apparatus is provided. The apparatus includes: a channel information receiver receiving channel information for a cell included in a clustering set measured by a user equipment; a cooperation cell determination unit determining an active set consisting of a cell performing CoMP on the user equipment by using the channel information; and a cooperation period determination unit determining a cooperation period in which at least one of the clustering set and the active set is applied to the user equipment, wherein the cooperation period in which the clustering set or the active set is applied to the user equipment is determined on a subframe basis or based on an integer multiple of the subframe, where the clustering set denotes a set of candidate cells which can be included in the active set.

DESCRIPTION OF EXEMPLARY EMBODIMENTS

Figure 1:
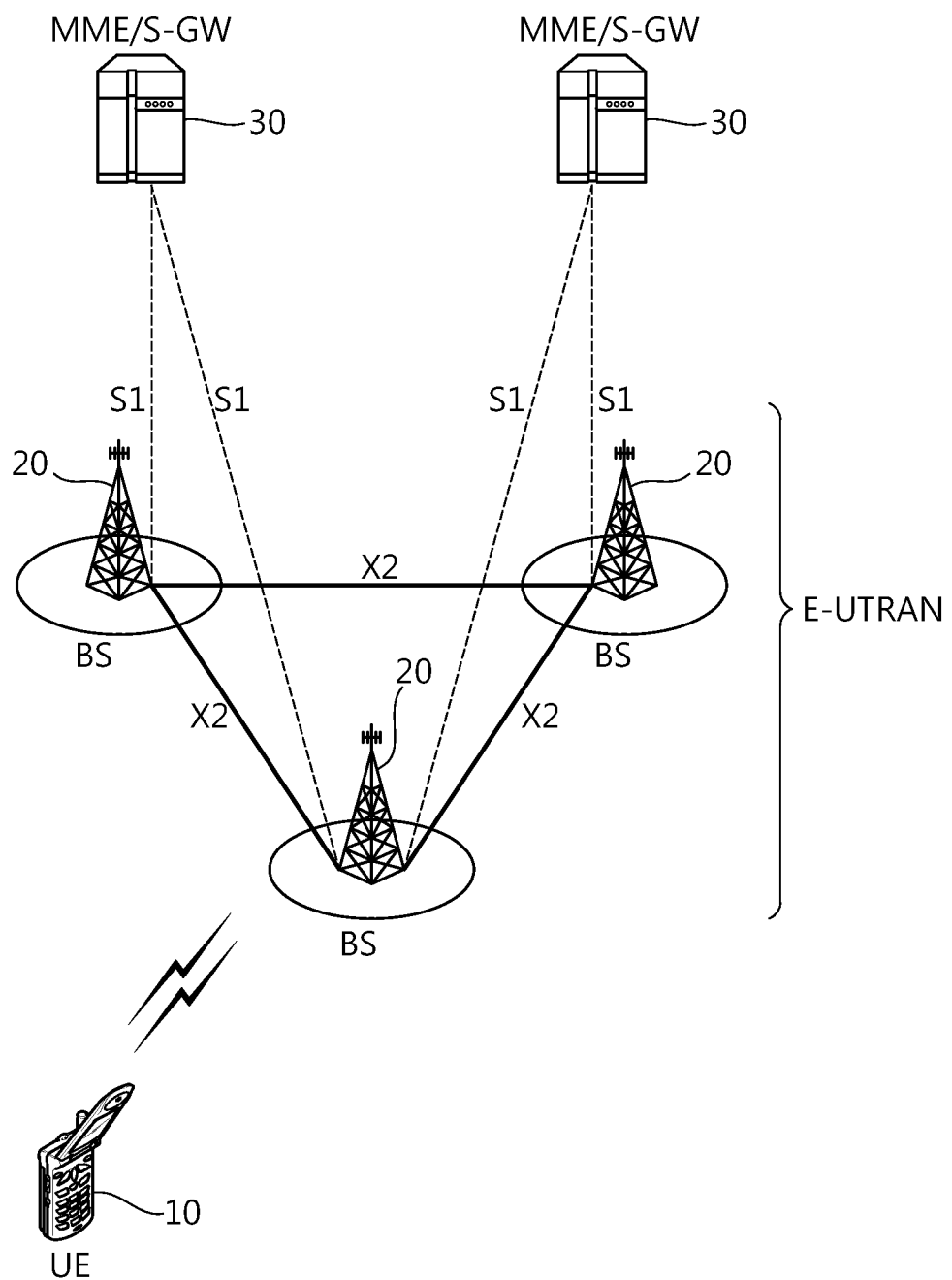
FIG. 1 shows a structure of a wireless communication system.

FIG. 1 shows a structure of a wireless communication system. The wireless communication system may have a network structure of an evolved-universal mobile telecommunications system (E-UMTS). The E-UMTS may be also referred to as a long term evolution (LTE) system. The wireless communication system can be widely deployed to provide a variety of communication services, such as voices, packet data, etc.

Referring to FIG. 1, an evolved-UMTS terrestrial radio access network (E-UTRAN) includes at least one base station (BS) 20 which provides a control plane and a user plane.

A user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. The cell is an area in which the BS 20 provides a communication service. Interfaces for transmitting user traffic or control traffic may be used between the BSs 20. Hereinafter, a downlink is defined as a communication link from the BS 20 to the UE 10, and an uplink is defined as a communication link from the UE 10 to the BS 20.

The BSs 20 are interconnected by means of an X2 interface. The BSs 20 are also connected by means of an S1 interface to an evolved packet core (EPC), more specifically, to a mobility management entity (MME)/serving gateway (S-GW) 30. The S1 interface supports a many-to-many relation between the BS 20 and the MME/S-GW 30.

Figure 2:
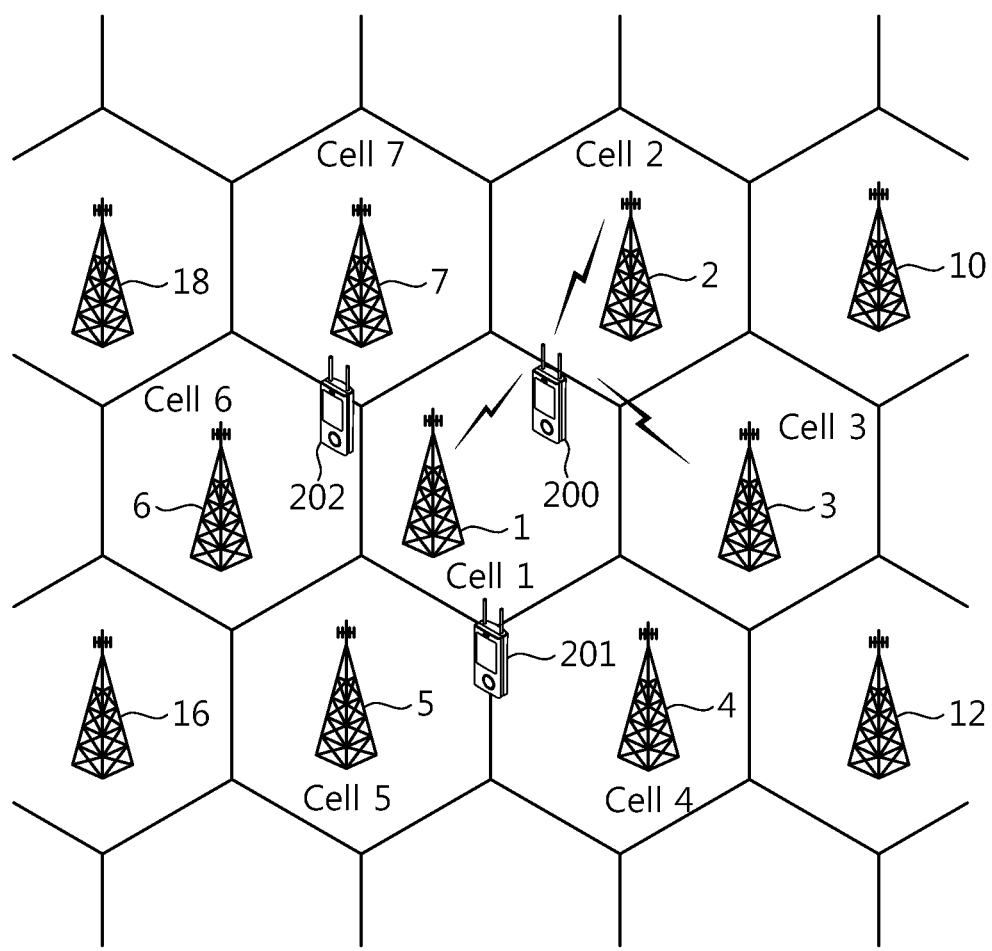
FIG. 2 shows a user equipment performing communication in a multi-cell environment.

FIG. 2 shows a UE performing communication in a multi-cell environment. Referring to FIG. 2, the UE communicates with a plurality of BSs located in difference cells.

In general, if each cell does not consider different cells in a multi-cell communication system and communication between the BS and the UE is achieved in a state where a frequency reuse '1' is maintained in the same time and frequency band, performance of a UE located near a cell edge significantly deteriorates due to interference from the different cells.

Several techniques have been researched to overcome performance deterioration caused by interference, and one of them is a cooperative multiple point transmission and receptions (CoMP) technique which effectively remove influence of interference to improve a data rate of an overall system. For example, a UE 200 belongs to a cell 1. Thus, the cell 1 is a serving cell, and a BS 1 is a serving BS. The UE 200 is located at an edge of the cell 1, a cell 2, and a cell 3. Thus, not only the serving BS (i.e., the BS 1) but also neighbor BSs (i.e., BS 2 and BS 3) may have a significant effect on the UE 200. Accordingly, if the BS 1, the BS 2, and the BS 3 cooperatively transmit data signals to the UE 200, interference signals are minimized and thus reception performance of the UE 200 can be improved.

When the serving BS (i.e., the BS 1) and the neighbor BSs (i.e., the BS 2 and the BS 3) cooperatively transmit the data signals to the UE 200, signals transmitted by BSs 4, 5, ..., K act as interference signals to the UE 200.

What matters to the UE includes from which cells of a specific set a cell participating in actual CoMP will be selected and at which period the selected cells will be changed according to a channel condition.

Terms used in the present invention will be defined hereinafter for clear understanding of the invention.

Figure 3:
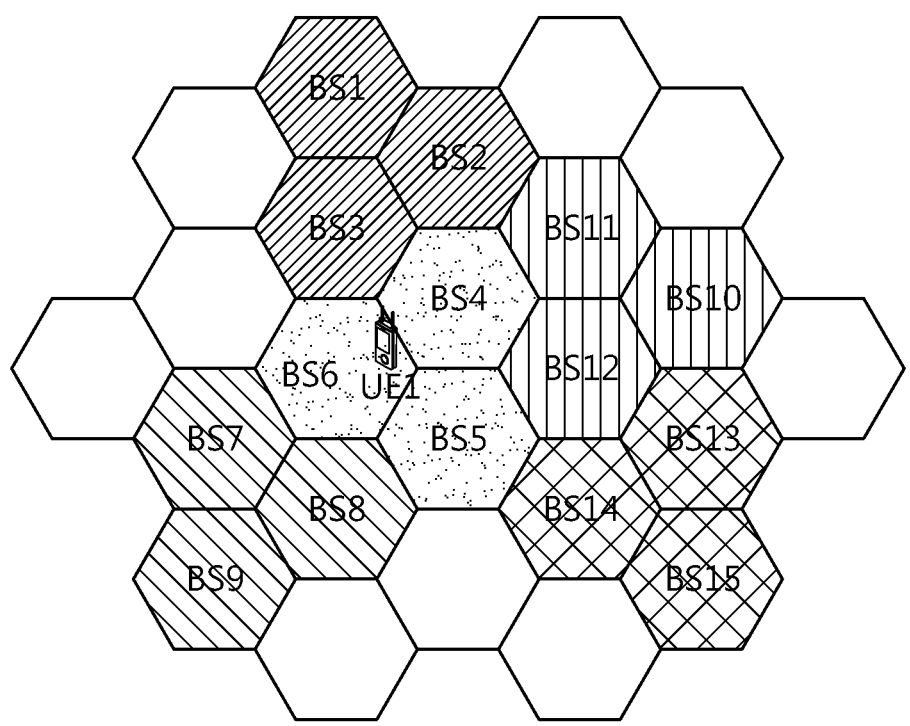
FIG. 3 shows a multi-cell environment in which cooperative multiple point transmission and reception (CoMP) is performed.

FIG. 3 shows a multi-cell environment in which CoMP is performed.

Referring to FIG. 3, each cell is represented by a hexagon in which a BS N (where N is a natural number) is deployed. The CoMP is a communication technique which transmits a signal to a destination such as a UE in cooperation of a plurality of cells. The CoMP can be classified into coordinated scheduling (CS) and joint processing (JP). For any specific time, the CS allows only one cell among multiple cells participating in the CoMP to perform transmission, and the JP allows a plurality of cells among the multiple cells participating in the CoMP to perform transmission.

A CoMP active set/area is a set of cells or areas which are activated to be able to participate in the CoMP. The CoMP active set may also be referred to as an active CoMP set or simply an active set. For example, in FIG. 3, cells in which a BS 4, a BS 5, and a BS 6 are located may be an active set for a specific UE (i.e., UE 1). The number of cells included in the active set may be 3 for example, but the present invention is not limited thereto.

A CoMP clustering set/area is a plurality of cells or areas defined to determine an active set. The CoMP clustering set is simply referred to as a clustering set. The clustering set can be seen as a set of candidate cells which share channel information between schedulers included in a BS of each cell and are thus finally used to determine the active set. The clustering set of FIG. 3 may be cells in which BSs 1 to 15 are located. The active set can be seen as a subset of the clustering set.

Cells participating in the CoMP are collectively referred to as a coordinated cell. The coordinated cell may indicate a clustering set or an active set in a sense that it participates in cooperative communication.

A CoMP transmission set/area is a set of cells or areas which perform actual transmission in any specific time. When using the CS, one cell performs transmission at any specific time, and thus a parameter indicating the CoMP transmission set may have a value of '1'. When using the JP, a plurality of cells perform transmission, and thus the parameter indicating the CoMP transmission set may have a value of '2' or higher.

A clustering set period is a duration in which a clustering set is maintained. In other words, the clustering set period is a minimum time unit in which the clustering set can be changed. In terms of signaling, the clustering set period can be seen as an interval between subframes in which a clustering configuration signal is transmitted.

An active set period is a time duration or time unit in which a cell or area included in an active set is maintained without alteration. In other words, the active set period is a minimum time unit in which the active set can be changed. In terms of signaling, the active set period can be seen as an interval between subframes in which an active-set configuration signal is transmitted.

An anchor cell is a cell or scheduler for performing a leading role in the CoMP. A downlink control signal (e.g., a control signal transmitted through a PDCCH) and/or uplink control signal (e.g., a control signal transmitted through a PUCCH) for performing the CoMP may be transmitted always by using the anchor cell.

Figure 4:
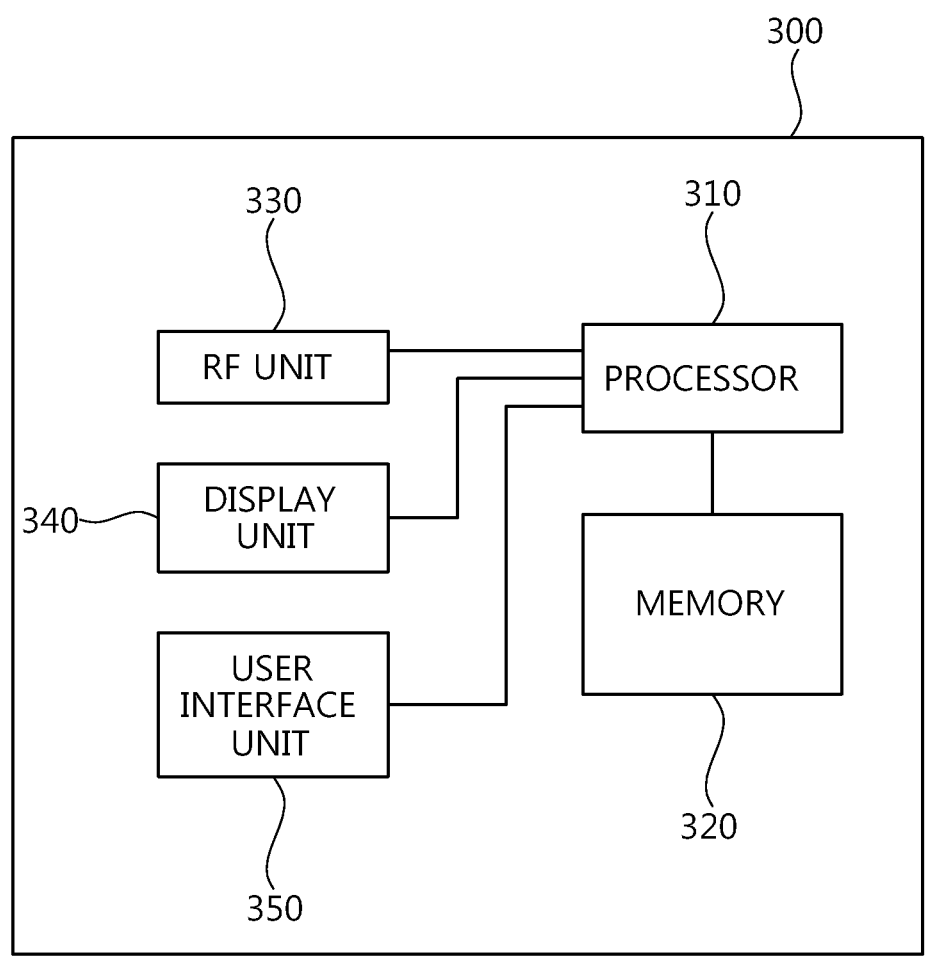
FIG. 4 is a block diagram showing constitutional elements of a user equipment.

FIG. 4 is a block diagram showing constitutional elements of a UE. A UE 300 includes a processor 310, a memory 320, a radio frequency (RF) unit 330, a display unit 340, and a user interface unit 350. Layers of a radio interface protocol are implemented in the processor 310. The processor 310 provides a control plane and a user plane. The function of each layer can be implemented in the processor 310.

The memory 320 is coupled to the processor 310 and stores an operating system of the UE, applications, and general files. The display unit 340 displays a variety of information of the UE and may use a well-known element such as a liquid crystal display (LCD), an organic light emitting diode (OLED), etc. The user interface unit 350 can be configured with a combination of well-known user interfaces such as a keypad, a touch screen, etc. The RF unit 330 is coupled to the processor 310 and transmits and/or receives radio signals.

Figure 5:
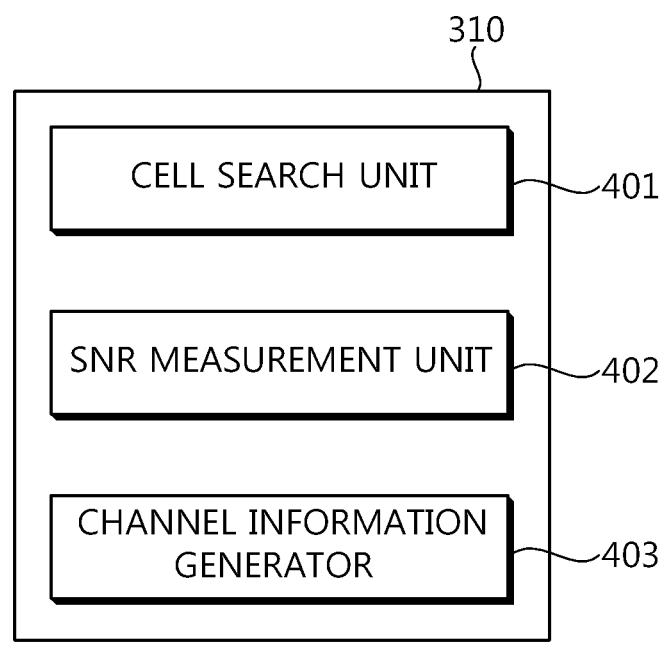
FIG. 5 is a block diagram showing a processor of a user equipment according to an embodiment of the present invention.

FIG. 5 is a block diagram showing a processor of a UE according to an embodiment of the present invention.

According to the embodiment of the present invention, a processor 310 of the UE includes a cell search unit 401, a signal to noise ratio (SNR) measurement unit 402 for measuring an average SNR for each cell, and a channel information generator 403.

The cell search unit 401 obtains cell search information such as unique identifiers (IDs) of all searchable cells by using a signal transmitted from a BS in a wireless fashion and outputs the obtained cell search information.

The SNR measurement unit 402 measures an SNR of cells searched by the cell search unit 401 by using signals output and input between the cell search unit 401 and the cells. Alternatively, the SNR measurement unit 402 may measure an SNR only for a cell included in a clustering set. The SNR measurement unit 402 may calculate an average SNR for each cell. As can be seen by its name, the SNR measurement unit 402 is used for SNR measurement, but it may be used for other purposes. For example, the SNR measurement unit 402 may measure a signal to interference plus noise ratio (SINR), a power attenuation rate, etc. That is, the SNR measurement unit 402 is a module for performing specific measurement to recognize a channel condition, and a value measured by this module may vary depending on each system requirement.

The channel information generator 403 obtains channel information of cells included in the clustering set by using the SNR measured for each cell by the SNR measurement unit 402. The channel information generator 403 processes the SNR for each cell, and thereafter quantizes the processed SNR. Then, the channel information generator 403 transmits the quantized SNR in uplink to the BS together with information indicating the searched cells. In this case, information indicating each cell corresponding to the channel information may be transmitted together. Such information indicating cells is referred to as cell information. The cell information may be a cell ID or the like.

After receiving the cell information and the channel information from the UE, the BS may transmit the received information to a cooperation determination apparatus. Then, the cooperation determination apparatus may determine a cooperation period and/or a cooperation cell by gathering cell information, channel information, or the like received from each BS, and then transmits cooperation period information and/or cooperation cell information. In this case, the cooperation period information may include a clustering set period, an active set period, or the like. The cooperation cell information may include information on a clustering set, an active set, a CoMP transmission set, or the like.

Figure 6:
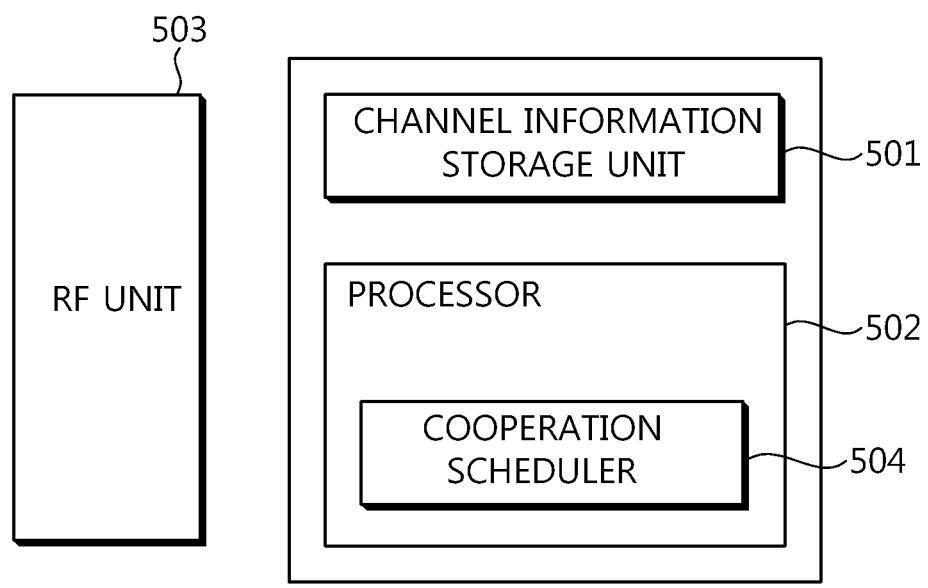
FIG. 6 is a block diagram showing an exemplary structure of a base station.

FIG. 6 is a block diagram showing an exemplary structure of a BS.

The BS includes an RF unit 503, a channel information storage unit 501, and a processor 502.

The channel information storage unit 501 stores per-cell channel information received via the RF unit 503 from each UE belonging to a specific cell. Further, the channel information storage unit 501 outputs or transmits the channel information to a cooperation determination apparatus and a cooperation scheduler 504 included in the processor 502.

The processor 502 includes the cooperation scheduler 504. The cooperation scheduler 504 performs cooperative scheduling by using the per-cell channel information received from the channel information storage unit 501, a cooperation period and cooperation cell information to be received from the cooperation determination apparatus, and scheduling information delivered from other BSs. In this case, channel information of UEs belonging to other cells may also be used. Information related to the performed cooperative scheduling may be delivered to other BSs by processing it in a required format according to a cooperative scheduling mechanism defined in a system.

If there is a need to configure an active set by using cells included in different clustering sets such as in a case where it is determined that a UE exists in a cell located at an edge of the clustering set, the processor 502 may instruct the UE to measure and transmit additional channel information. Details thereof will be described below. The BS may be included (or not included) in an anchor cell.

Figure 7:
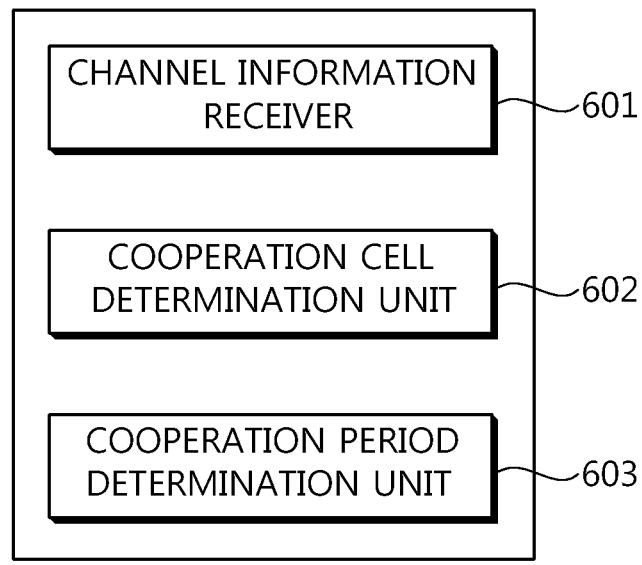
FIG. 7 is a block diagram showing a cooperation determination apparatus according to an embodiment of the present invention.

FIG. 7 is a block diagram showing a cooperation determination apparatus according to an embodiment of the present invention.

Referring to FIG. 7, the cooperation determination apparatus may include a channel information receiver 601, a cooperation cell determination unit 602, and a cooperation period determination unit 603.

The channel information receiver 601 receives channel information and cell information from BSs. The channel information and the cell information may be delivered by a serving BS by receiving them from a UE in a serving cell.

The cooperation cell determination unit 602 determines a cooperation cell and transmits cooperation cell information to each BS. The cooperation cell determination unit 602 may determine the cooperation cell by using each UE's per-cell channel information received from each BS.

The cooperation period determination unit 603 may determine a cooperation period and outputs cooperation period information. The cooperation period is determined by considering the cooperation cell and the UE's per-cell channel information received by the channel information receiver 601. The cooperation period may be determined differently according to a channel condition variation or the number of cooperation cells, a type the cooperation cells, or the like. For example, the cooperation period may vary depending on whether the cooperation cell is a cell constituting a clustering set or a cell constituting an active set.

Alternatively, the cooperation period determination unit 603 may determine the cooperation period by using a method pre-defined according to a mode configuration indicator transmitted from the BS. The mode configuration indicator is a signal indicating a unit or mechanism of determining the cooperation period. The unit or mechanism of determining the cooperation period may be pre-defined between the BS and the cooperation determination apparatus.

The cooperation determination apparatus transmits cooperation cell information and cooperation period information to each BS. Although it is described herein that the cooperation determination apparatus is implemented with a separate apparatus, this is for exemplary purposes only, and thus the present invention is not limited thereto. That is, the cooperation determination apparatus may be included in a specific BS. For example, the cooperation determination apparatus may be functionally included in a processor of a BS located in an anchor cell. As such, in a case where a BS also performs a function as the cooperation determination apparatus, the aforementioned information can be processed in the BS without having to transmit cell information and channel information to the separate cooperation determination apparatus.

Now, a method of performing CoMP in the aforementioned UE, serving BS, and cooperation determination apparatus will be described. It is assumed herein that the serving BS does not include the cooperation determination apparatus, and the cooperation determination apparatus is included in an anchor BS located in an anchor cell. Hereinafter, the serving BS is simply referred to as a BS.

Figure 8:
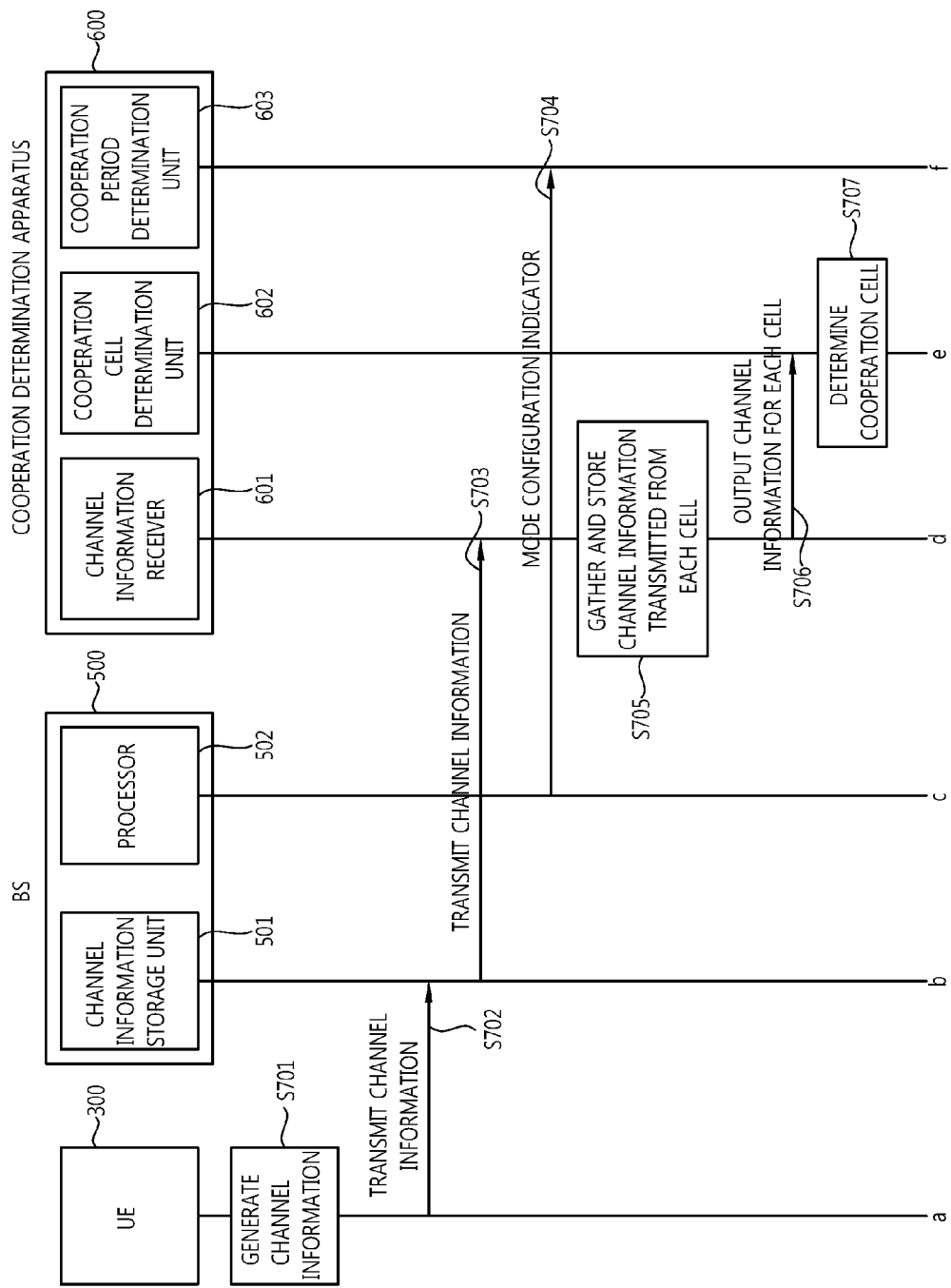
FIG. 8 and FIG. 9 are a flowchart showing a signal flow among a user equipment, a base station, and a cooperation determination apparatus when performing a method of CoMP according to an embodiment of the present invention.
Figure 9:
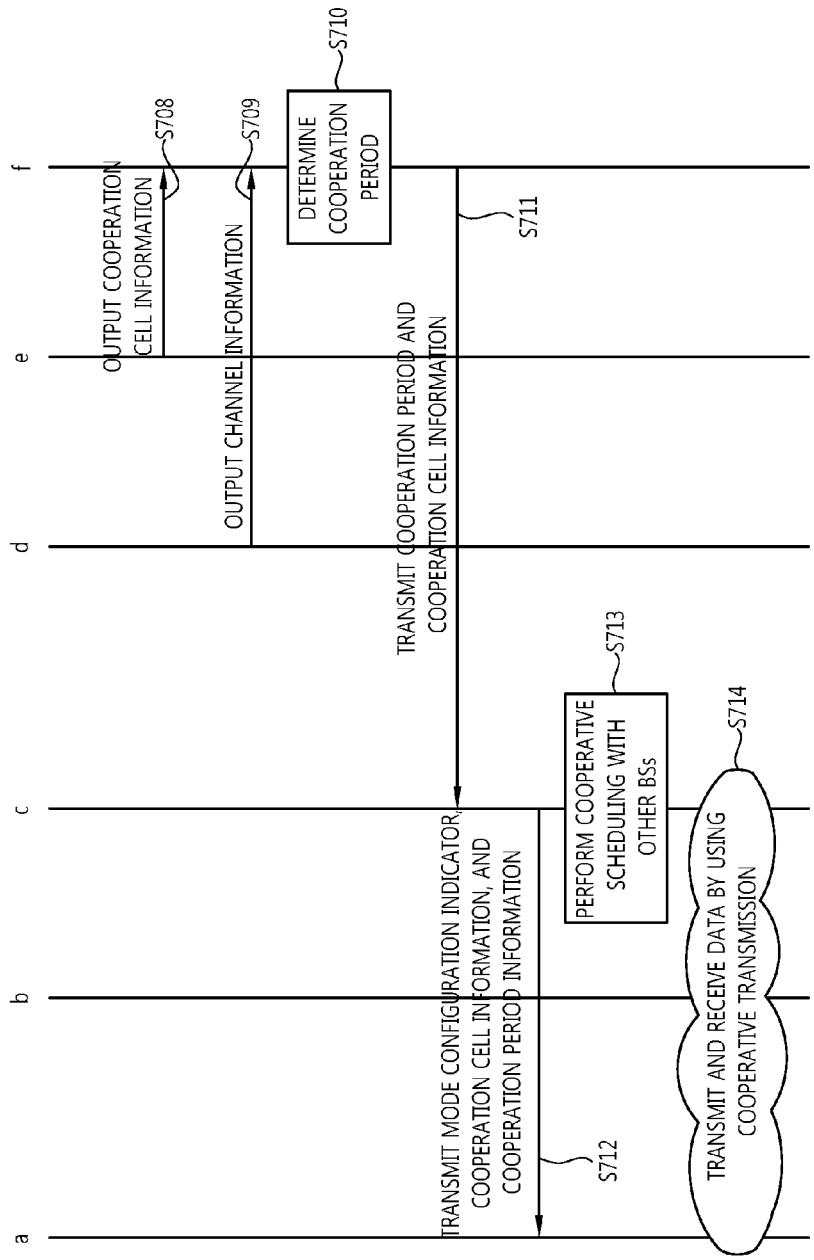

FIG. 8 and FIG. 9 are a flowchart showing a signal flow among a UE, a BS, and a cooperation determination apparatus when performing a method of CoMP according to an embodiment of the present invention.

According to the present invention, a UE 300 generates channel information by using a result of channel measurement (step S701). Then, the UE 300 transmits the generated channel information to a BS 500 of a serving cell (step S702). Then, a channel information storage unit 501 of the BS 500 receives and stores the channel information.

The channel information stored in the channel information storage unit 501 is transmitted to a cooperation determination apparatus 600 (step S703). In this case, a processor 502 may transmit a mode configuration indicator to the cooperation determination apparatus 600 (step S704). As described above, the mode configuration indicator indicates a unit or mechanism of determining a cooperation period. A process of determining the cooperation period according to the mode configuration indicator is described below.

The channel information transmitted from each BS is received and stored by a channel information receiver 601 of the cooperation determination apparatus 600 (step S705). That is, channel information for each cell is gathered by the channel information receiver 601. The channel information receiver 601 may output the channel information gathered for each cell to a cooperation cell determination unit 602 (step S706).

The cooperation cell determination unit 602 determines a cooperation cell based on a channel condition by using the channel information (step S707). That is, cells constituting a clustering set, active set, and CoMP transmission set for the UE are determined.

The cooperation cell determination unit 602 outputs information on the cooperation cell to a cooperation period determination unit 603 (step S708). Further, the channel information receiver 601 also outputs stored channel information to the cooperation period determination unit 603 (step S709). Then, the cooperation period determination unit 603 determines a cooperation period for the input cooperation cell information (step S710).

The cooperation period determination unit 603 may determine the cooperation period by considering a type of a set in which the cooperation cell is included, a channel condition, a signaling amount, an overhead caused by a computation amount, or the like. For example, a cooperation cell included in a clustering set and a cooperation cell included in an active set may have the same cooperation period or different cooperation periods.

In addition, the cooperation period may be configured according to a mode configuration indicator.

The cooperation period determination unit 603 transmits cooperation cell information and cooperation period information to the BS 500 (step S711). The cooperation scheduler 502 of the BS 500 receives the cooperation cell information and the cooperation period information. The BS 500 transmits the cooperation cell information and the cooperation period information to the UE 300 (step S712). Cooperation cell information on cells which are included in the clustering set may be transmitted only to the BS and may not be delivered to the UE. However, if necessary, cooperation cell information on a cooperation cell included in the clustering set may be delivered to the UE by using a higher layer (e.g., RRC) signal. If the determined cooperation cell is a cell included in the active set, cooperation cell information may be transmitted to the UE by using the higher layer signal or a physical layer signal. The active set may be configured differently for each UE, or may be configured identically for each UE. For example, the CoMP may be performed by configuring respective active sets for all UEs in a specific cell. Among the UEs in the specific cell, UEs having similar channel conditions may be grouped and the same active set may be configured for UEs in the same group. In addition, the number of cooperation cells included in the active set may be fixed or may be variable.

The cooperation scheduler 502 performs cooperative scheduling with other BSs according to the cooperation cell information and the cooperation period information (step S713). According to the cooperative scheduling between the BSs, the UE 300 may transmit and receive data in a multi-cell environment according to the method of CoMP (step S714). In this case, the data transmitted and received by using the method of CoMP may include uplink data and downlink data.

Hereinafter, a method of configuring a cooperation period according to a mode configuration indicator will be described in detail. According to the mode configuration indicator, the cooperation period can be configured by using any one of methods defined in FIG. 10 and FIG. 11.

Figure 10:
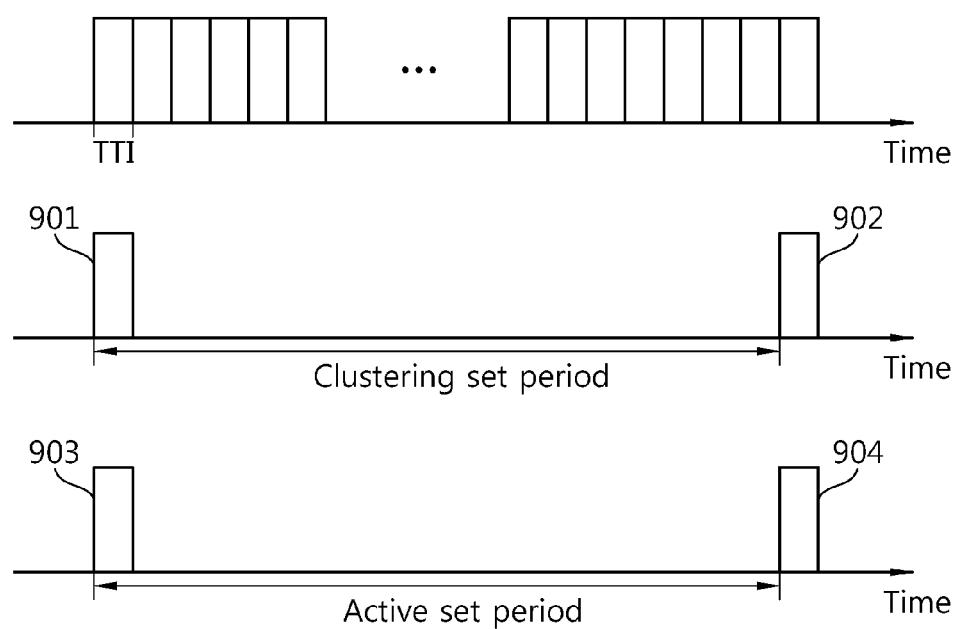
FIG. 10 shows an example of configuring a cooperation period.

FIG. 10 shows an example of configuring a cooperation period.

The cooperation period (e.g., a clustering set period and an active set period) may be configured on a superframe basis. A superframe denotes a time period configured to a multiple integer of a subframe. For example, the clustering set period and the active set period may be configured to any one of 10 ms, 20 ms, and 40 ms. That is, clustering set configuration signals 901 and 902 or active set configuration signals 903 and 904 may be transmitted on the superframe basis.

Configuring of the clustering set period and the active set period on the superframe basis is preferably used when a channel environment related to a UE changes slowly.

When the active set period is configured on the superframe basis, cooperation cell information constituting an active set is preferably delivered to a UE by using a higher layer signal. Cooperative cell information constituting a CoMP transmission set performing actual transmission may be delivered by using not only the higher layer signal but also a physical layer signal. When it is delivered by using the physical layer signal, the cooperation cell information may change in every subframe. This is because the method of CoMP may have a different CoMP transmission set according to whether the method is based on the CS or the JP even if the same active set is used.

Figure 11:
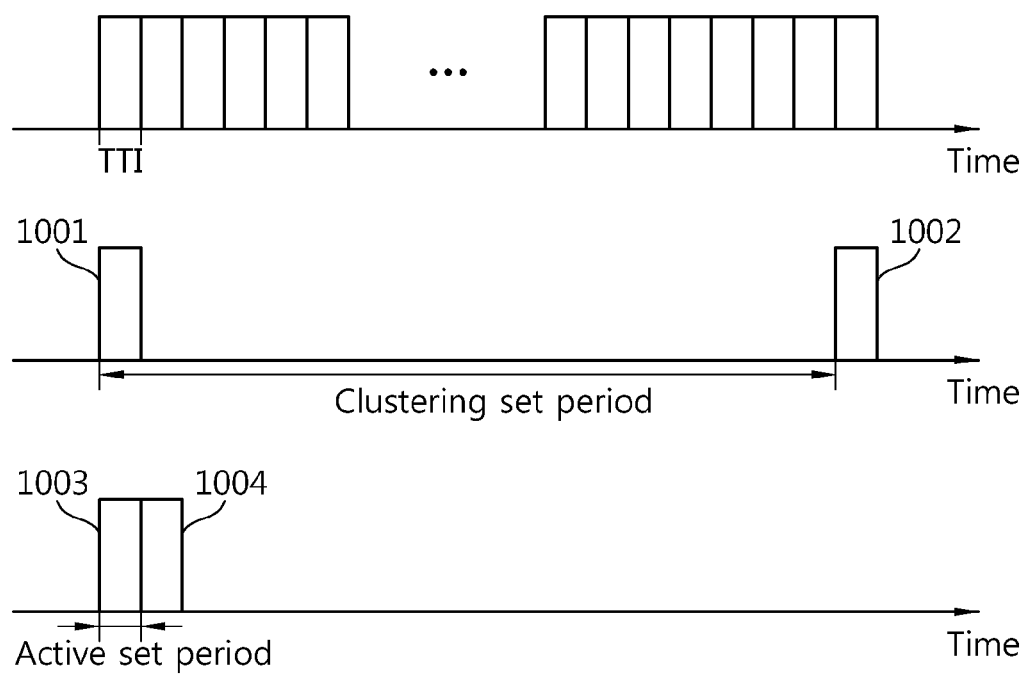
FIG. 11 shows another example of configuring a cooperation period.

FIG. 11 shows another example of configuring a cooperation period.

The cooperation period may be configured differently according to a type of a set in which a cooperation cell is included. For example, a clustering set period may be configured on a superframe basis, and an active set period may be configured on a subframe basis. That is, clustering set configuration signals 1001 and 1002 may be transmitted on the superframe basis, and active set configuration signals 1003 and 1004 may be transmitted on the subframe basis.

As such, by differently configuring the cooperation period according to the type of the set in which the cooperation cell is included, the following advantages can be obtained. A clustering set period is determined based on an integer multiple of a subframe and thus a clustering set changes slowly. Therefore, an overhead of channel information exchange performed among a plurality of cells can be avoided from excessive increase. On the other hand, an active set period may be determined on a subframe basis to cope with a fast channel change. What is considered in this case is that an active set participating in actual CoMP is highly likely to change fast according to a channel environment. In case of LTE, a minimum unit of scheduling is a subframe, and thus the active set period may also be determined on a subframe basis.

If the active set period is configured on the subframe basis, cooperation cell information indicating the active set preferably uses a physical layer signal. However, the present invention is not limited thereto, and thus a higher layer signal can also be used.

The cooperation cell information indicating the active set may be transmitted to an anchor cell or to a coordinated cell other than the anchor cell. In both cases, the cooperation cell information may be transmitted by using the higher layer signal.

However, in order to perform scheduling suitable for a link condition, the cooperation cell information may be transmitted using the physical layer signal. When the cooperation cell information indicating the active set is transmitted to the coordinated cell, a radio interface needs to be provided between cells.

The cooperation period determination unit 603 may select one of the aforementioned two examples for configuring the cooperation period according to a value of the mode configuration indicator. For example, if the value of the mode configuration indicator is '1', the method of FIG. 10 may be selected, and if the value there of is '0', the method of FIG. 11 may be selected. Although any one of the two methods of configuring the cooperation period is selected in the above example, the present invention is not limited thereto. That is, the method of configuring the cooperation period may be various, and the mode configuration indicator may indicate one of the various methods.

Hereinafter, a method of configuring a cooperation cell by a cooperation cell determination unit will be described.

Figure 12:
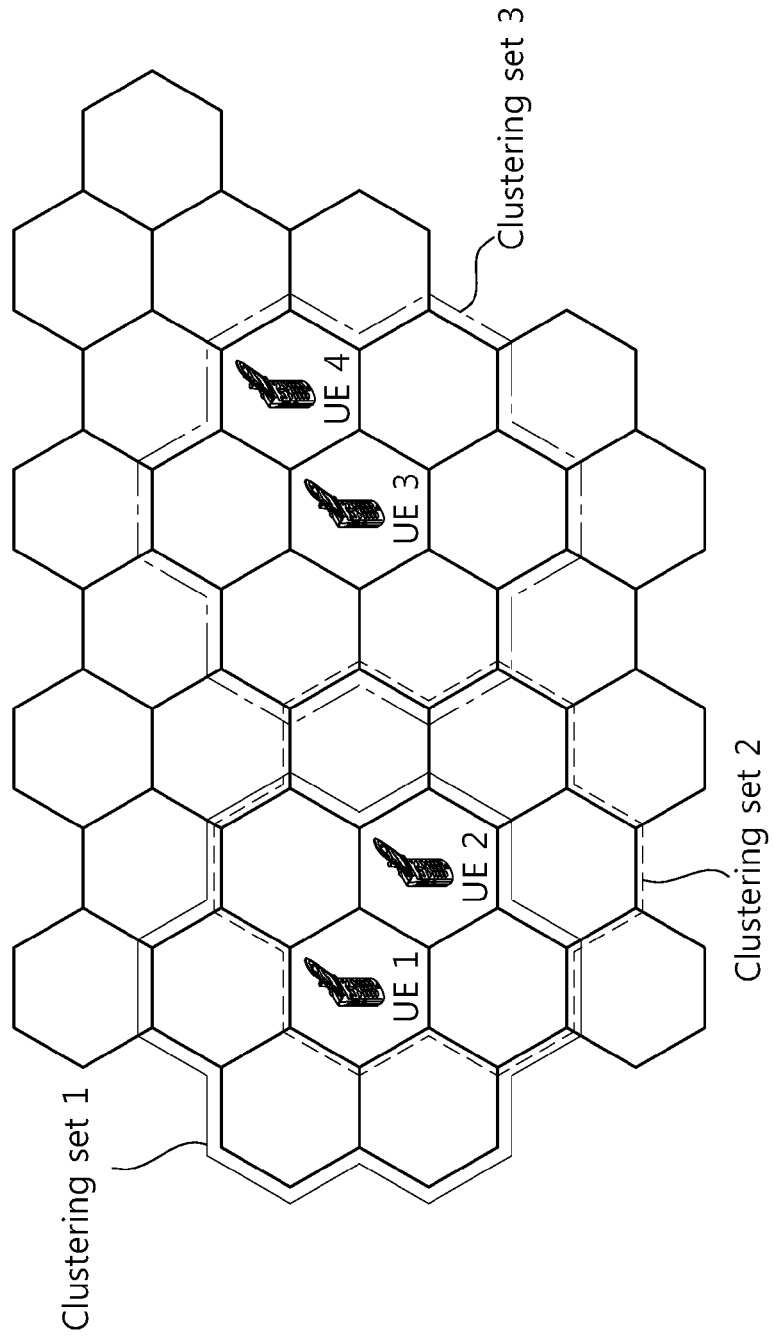
FIG. 12 shows an example of a method of configuring a clustering set.

FIG. 12 shows an example of a method of configuring a clustering set.

The clustering set may be configured individually according to each UE. For example, a clustering set 1 is configured for a UE 1, and a clustering set 2 is configured for a UE 2. That is, even if UEs are located in the same area, a clustering set may be configured differently for each UE.

Unlike the aforementioned method, the clustering set may be configured according to a specific cell group or area. That is, the same clustering set may be configured for UEs located in a specific area. For example, a clustering set 3 is equally configured to a UE 3 and a UE 4 both of which are located in a specific area.

In the former case, an optimal clustering set can be determined and thus performance of CoMP can be maximized, but there is a disadvantage in that a signaling overhead is great. This is because a separate clustering set is configured for each UE. In the latter case, the performance of CoMP may deteriorate to some extent, but it is a practical measure in a sense that the signaling overhead can be reduced. However, in the latter case, a UE (i.e., UE 4) located at an edge of the clustering set may experience performance deterioration. Thus, there is a need for a method for solving such a problem.

Figure 13:
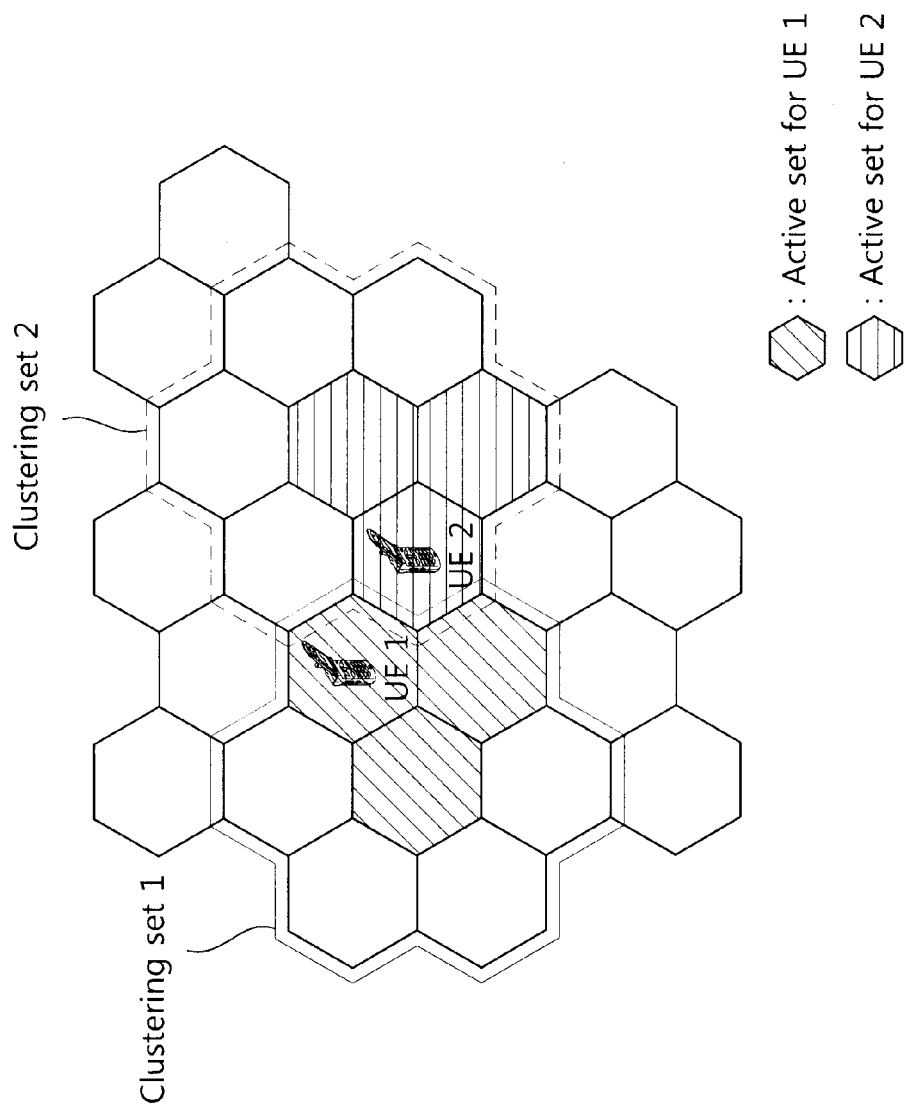
FIG. 13 shows an example of configuring an active set.

FIG. 13 shows an example of configuring an active set.

In a case where the active set is configured for a specific UE, for example, a UE located at an edge of a clustering set, a cooperation determination apparatus may configure the active set only for a cell included in the clustering set for the specific UE. For example, in FIG. 13, an active set is configured for a UE 1 among cells existing in a clustering set 1, and an active set is configured for a UE 2 among cells existing in a clustering set 2. In this method, even if there is a possibility that an optimal active set for the UE 1 includes cells located in the clustering set 2, the active set is configured only among cells existing in the clustering set 1. That is, if a cell included in a neighbor clustering set is included in the active set, such a cell is excluded in the configuration of the active set even if it is predicted that better CoMP can be performed. Such a method has an advantage in that complexity of implementation can be decreased and an overhead of signaling exchange performed among different clustering sets can be decreased.

Figure 14:
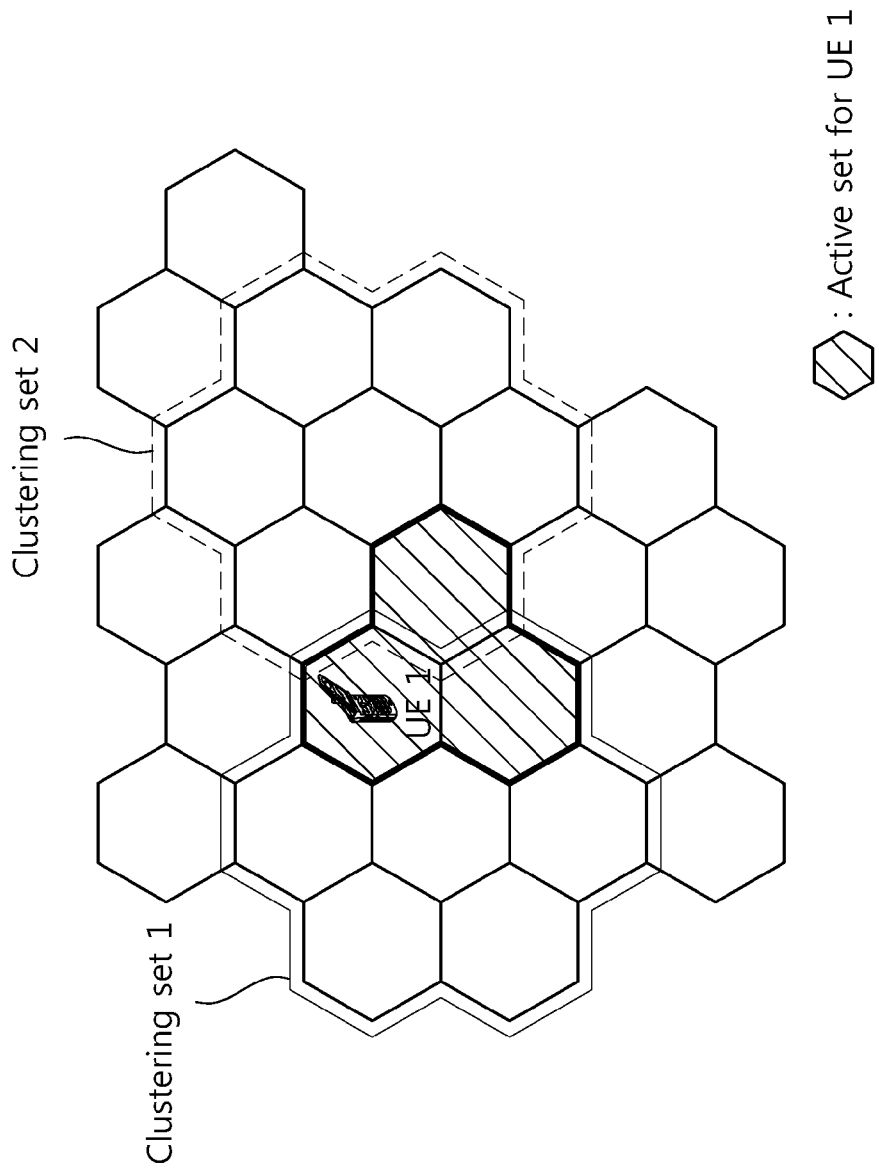
FIG. 14 shows another example of configuring an active set.

FIG. 14 shows another example of configuring an active set.

In a case where the active set is configured for a specific UE, for example, a UE located at an edge of a clustering set, a cooperation determination apparatus may exchange additional information between neighbor clustering sets to configure the active set by using cells included in different clustering sets. As shown in FIG. 14, an active set for a UE 1 includes cells included in a clustering set 1 and a clustering set 2. To configure the active set as described above, a control signal may be additionally provided to the UE 1 in order to report a result obtained by measuring cells included in the clustering set 2 other than the clustering set 1 in which the UE 1 is included. For convenience of explanation, such an additional control signal is referred to as an additional measurement indicator. The additional measurement indicator may be transmitted by a processor of a BS to the UE. Upon receiving the additional measurement indicator, the UE can perform measurement on cells included in another clustering set other than a clustering set in which the UE is included. In this case, the UE may perform channel measurement by using a cell specific reference signal for a cell included in the clustering set 2 or a UE-specific reference signal.

Alternatively, the UE may use a dedicated reference signal additionally defined other than the reference signals. The dedicated reference signal may be defined to be used when a UE located at an edge of a clustering set performs channel measurement on a cell included in another clustering set. The dedicated reference signal may be transmitted by a BS receiving the additional measurement indicator. For example, if it is assumed that a BS 1 included in the clustering set 1 transmits the additional measurement indicator and a BS 2 included in the clustering set 2 receives the additional measurement indicator, the BS 2 can recognize that a UE included in the clustering set 1 needs to perform channel measurement on a cell included in the clustering set 2. Therefore, the BS 2 transmits a dedicated or common reference signal to allow the UE to perform channel measurement on the cell included in the clustering set 2. Alternatively, a separate control signal for requesting transmission of the dedicated reference signal by the BS 1 to the BS 2 or a signal for reporting existence of a cell belonging to the clustering set 2 among cells to be measured by a specific DE may be transmitted.

A measurement result obtained by the UE may be provided to a cooperation determination apparatus and thus be used to configure an active set.

In a case where a cooperation determination apparatus for the clustering set 1 exists in the BS 1 and a cooperation determination apparatus for the clustering set 2 exists in the BS 2, a right to determine an active set between the BS 1 and the BS 2 may be problematic. Such a problem can be solved by handing over the right to determine the active set between the BSs. For example, if the result of channel estimation and the right to determine the active set are handed over from the BS 2 to the BS 1, the BS 1 may determine the active set by including a cell included in the clustering set 2.

According to the present invention, an overhead occurring when determining a cell participating in cooperative multiple point transmission and reception (CoMP) can be reduced, and scheduling considering influence of inter-cell interference can be performed.

In addition, an optimal active set can be configured for a user equipment in a cell located at an edge of a clustering set, and thus performance of CoMP can be improved.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method for operating a user equipment (UE) capable of receiving a cooperative multiple point transmission from a plurality of cells, the method comprising:
   receiving clustering set information informing the UE about a plurality of clustering sets, wherein the clustering set information is received through a radio resource control (RRC) signal and each of the plurality of clustering sets is non-overlapped and comprises fixed cells;
   transmitting channel information for first cells included in a first clustering set or for second cells included in the first clustering set and a second clustering set according to a location of the UE, the first clustering set being a clustering set including a cell where the UE is located, and the second clustering set being a clustering set adjacent to the first clustering set;
   receiving active set information, which indicates cells included in an active set, and a cooperation period information indicating a duration in which the active set is maintained, wherein the active set information and the cooperation period information are received through a physical layer signal; and
   receiving signals from the cells included in the active set during the duration,
   wherein when the UE is located in a cell which is included in the first clustering set and not adjacent to the second clustering set, the UE transmits channel information of the first cells for selection of the active set and the active set comprises cells only included in the first clustering set, and
   wherein when the UE is located in a cell which is included in the first clustering set and adjacent to the second clustering set, the UE transmits channel information of the second cells for selection of the active set and the active set comprises cells included in the first clustering set and at least one cell included in the second clustering set.

2. The method of claim 1, further comprising:
   receiving an additional measurement indicator indicating channel measurement on cells included in the second clustering set when the UE is located in a cell which is included in the first clustering set and adjacent to the second clustering set.

3. The method of claim 2, wherein the channel measurement is performed by using dedicated reference signals transmitted from the second clustering set.

4. The method of claim 1, wherein the plurality of clustering sets are fixed.

5. The method of claim 1, wherein the duration is one subframe.

6. A user equipment (UE) capable of receiving a cooperative multiple point transmission from a plurality of cells, the user equipment comprising:
   a radio frequency (RF) unit for transmitting and receiving radio signals; and
   a processor coupled with the RF unit and configured for:
   receiving clustering set information informing the UE about a plurality of clustering sets, wherein the clustering set information is received through a radio resource control(RRC) signal and each of the plurality of clustering sets is non-overlapped and comprises fixed cells;
   transmitting channel information for first cells included in a first clustering set or for second cells included in the first clustering set and a second clustering set according to a location of the UE, the first clustering set being a clustering set including a cell where the UE is located, and the second clustering set being a clustering set adjacent to the first clustering set;
   receiving active set information, which indicates cells included in an active set, and a cooperation period information indicating a duration in which the active set is maintained, wherein the active set information and the cooperation period information are received through a physical layer signal; and
   receiving signals from the cells included in the active set during the duration,
   wherein when the UE is located in a cell included in the first clustering set and not adjacent to the second clustering set, the processor transmits channel information of the first cells for selection of the active set and the active set comprises cells only included in the first clustering set, and
   when the UE is located in a cell included in the first clustering set and adjacent to the second clustering set, the processor transmits channel information of the second cells for selection of the active set and the active set comprises cells included in the first clustering set and at least one cell included in the second clustering set.

* * * * *